United States Patent
Jung et al.

(10) Patent No.: US 9,690,600 B2
(45) Date of Patent: Jun. 27, 2017

(54) RECONFIGURABLE PROCESSOR AND METHOD OF OPERATING THE SAME

(71) Applicant: SAMSUNG ELECTRONICS CO., LTD., Suwon-si, Gyeonggi-do (KR)

(72) Inventors: Jin-sae Jung, Yongin (KR); Suk-jin Kim, Seoul (KR); Do-hyung Kim, Hwaseong (KR); Si-hwa Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 176 days.

(21) Appl. No.: 14/334,112

(22) Filed: Jul. 17, 2014

(65) Prior Publication Data

US 2015/0100772 A1  Apr. 9, 2015

(30) Foreign Application Priority Data

Oct. 8, 2013  (KR) .......................... 10-2013-0120193

(51) Int. Cl.
*G06F 12/00* (2006.01)
*G06F 9/445* (2006.01)
*G06F 15/78* (2006.01)

(52) U.S. Cl.
CPC ...... *G06F 9/44505* (2013.01); *G06F 15/7871* (2013.01)

(58) Field of Classification Search
CPC ....... G06F 12/00; G06F 12/0855; G06F 9/381
USPC .............................. 711/170, 1, 140, E12.049
See application file for complete search history.

(56) References Cited

U.S. PATENT DOCUMENTS

| | | | |
|---|---|---|---|
| 9,244,883 B2 * | 1/2016 | Park | G06F 15/7867 |
| 2009/0217102 A1 * | 8/2009 | Co | G11C 29/56 714/42 |
| 2010/0268862 A1 | 10/2010 | Park et al. | |
| 2011/0191539 A1 * | 8/2011 | Hugosson | G06F 12/08 711/118 |
| 2013/0339634 A1 * | 12/2013 | Zhang | G11C 16/26 711/154 |
| 2015/0113229 A1 * | 4/2015 | Boettiger | G06F 9/528 711/145 |
| 2016/0259564 A1 * | 9/2016 | Hori | G06F 3/0608 |

FOREIGN PATENT DOCUMENTS

KR  10-2010-0115578  10/2010

* cited by examiner

*Primary Examiner* — Sean D Rossiter
(74) *Attorney, Agent, or Firm* — Staas & Halsey LLP

(57) ABSTRACT

Provided are a reconfigurable processor and a method of operating the reconfigurable processor. In the method, configuration data is requested to access based on virtual addresses, and accessing of the configuration data by using a processor core is controlled to read the configuration data from addresses of a configuration memory mapped to the virtual addresses.

19 Claims, 7 Drawing Sheets

FIG. 4

| LOOP ID | LOOP VALID | LINE VALID | COMPLETED | LOOP SIZE | CM ADDR | MM ADDR |
|---|---|---|---|---|---|---|
| Loop 1 | 1 | 1 | 1 | 30 | 0 ~ 30 | 0 ~ 30 |
| | 1 | 1 | 0 | 120 | $1^{st}$ : 31~100<br>$2^{nd}$ : 1~5 | 31~150 |
| Loop 2 | 0 | — | — | 320 | $3^{rd}$ : 51~100<br>$4^{th}$ : 1~100<br>$5^{th}$ : 1~100<br>$6^{th}$ : 1~70 | 151~470 |
| Loop 3 | 0 | — | — | 30 | 70~100 | 470~500 |
| ... | ... | ... | ... | ... | ... | ... |

| LOOP VALID | LINE VALID | COMPLETED | DESCRIPTION |
|---|---|---|---|
| 1 | 1 | 1 | ENTIRE CONFIGURATION DATA REGARDING CURRENT LOOP IS VALID |
| 1 | 1 | 0 | ONLY SOME OF CONFIGURATION DATA REGARDING CURRENT LOOP IS STORED IN CONFIGURATION MEMORY<br>- ACCESSING OF STORED CONFIGURATION DATA IS ALLOWED (PERFORM CGA MODE)<br>- LOAD REMAINING CONFIGURATION DATA FROM MAIN MEMORY |
| 1 | 0 | — | CONFIGURATION DATA REGARDING CURRENT LOOP IN CURRENT LINE OF CONFIGURATION MEMORY IS INVALID.<br>LOAD REMAINING CONFIGURATION DATA FROM MAIN MEMORY |
| 0 | — | — | CONFIGURATION DATA REGARDING CURRENT LOOP IS NOT STORED IN CONFIGURATION MEMORY.<br>LOAD CONFIGURATION DATA FROM MAIN MEMORY |

RECONFIGURABLE PROCESSOR AND METHOD OF OPERATING THE SAME

RELATED APPLICATIONS

This application claims the benefit of Korean Patent Application No. 10-2013-0120193, filed on Oct. 8, 2013, in the Korean Intellectual Property Office, the disclosure of which is incorporated herein in its entirety by reference.

BACKGROUND

1. Field

One or more embodiments of the present invention relate to a reconfigurable processor and a method of operating the reconfigurable processor.

2. Description of the Related Art

A reconfigurable architecture is an architecture that enables a hardware configuration of a computing device to be changed to be optimized for conditions of a specific task so as to perform the specific task.

If the specific task is performed using only fixed hardware of the computing device, when details of the specific task are slightly changed, it is difficult to efficiently handle the changed details due to fixed functions of the fixed hardware. If the specific task is performed using only software, the specific task can be performed according to the changed details of the specific task by changing operations of the software but the speed of performing the task may be lower than when the hardware is used.

The reconfigurable architecture may be designed to satisfy both usefulness of hardware and usefulness of software. In particular, much attention has been paid to such as a reconfigurable architecture in the field of digital signal processing (DSP) in which the same specific task is repeatedly performed.

There are many types of reconfigurable architecture. A coarse-grained array (CGA) is a representative example of the reconfigurable architecture. A reconfigurable architecture that enables some of the CGA to be used as a very long instruction word (VLIW) machine has been recently introduced.

A reconfigurable architecture may have two execution modes: a CGA mode and a VLIW mode. In general, in a reconfigurable architecture having the CGA mode and the VLIW mode, loop operations may be performed in the CGA mode and other general operations may be performed in the VLIW mode.

SUMMARY

One or more embodiments of the present invention include a reconfigurable processor and a method of operating the reconfigurable processor.

One or more embodiments of the present invention include a computer readable recording medium having recorded thereon a computer program for performing the method.

Additional aspects will be set forth in part in the description which follows and, in part, will be apparent from the description, or may be learned by practice of the presented embodiments.

According to one or more embodiments of the present invention, a reconfigurable processor includes a processor core to request access to configuration data regarding a schedule of loop operations to be performed in parallel by function units by using virtual addresses; a configuration memory to store the configuration data loaded from a main memory; and a configuration memory management unit to control the accessing of the configuration data by the processor core to read the configuration data from addresses of the configuration memory mapped to the virtual addresses.

A range of the virtual addresses may correspond to a range of addresses of the configuration data stored in the main memory.

The configuration memory management unit may manage addresses of the main memory and the addresses of the configuration memory by mapping the addresses of the main memory and the addresses of the configuration memory to each other, based on the virtual addresses.

When size of the configuration data stored in the main memory exceeds size of the configuration memory, the configuration memory management unit may allocate the addresses of the configuration memory to the configuration data so as to sequentially load the configuration data into the configuration memory.

The configuration memory management unit may control the accessing of the configuration data, based on a configuration memory management table to manage a loading state of the configuration data in the configuration memory.

The loading state of the configuration data may be determined based on the schedule of the loop operations that is scheduled by a compiler.

The configuration memory management table may include a loop valid field which represents whether the configuration data to be processed is stored in the configuration memory. When the loop valid field represents invalid, the configuration memory management unit may load the configuration data from the main memory.

The configuration memory management table may include a line valid field which represents whether the configuration data to be processed is stored at all addresses of at least one line of the configuration memory. When the line valid field represents invalid, the configuration memory management unit may load the configuration data from the main memory until the configuration data is stored at all the addresses of the at least one line.

The configuration memory management table may include a completed field which represents whether all or some of the configuration data to be processed is stored in the configuration memory. When the completed field represents that some of the configuration data is stored, the configuration memory management unit may allow the processor core to access the some of the configuration data stored, and loads the remaining configuration data from the main memory.

The configuration memory management table may include at least one of a loop size field which represents loop size of the loop operation to be processed; and a configuration memory address field which represents information regarding the addresses of the configuration memory mapped to the virtual addresses.

The configuration data may include operation code of the function units and information regarding a connection between the function units to process the loop operation according to a coarse-grained architecture (CGA) mode According to one or more embodiments of the present invention, a method of operating a reconfigurable processor includes storing configuration data in a configuration memory, the configuration data loaded from a main memory and specifying a schedule of loop operations to be processed in parallel with function units of a processor core; requesting, by the processor core, to access the configuration data by using virtual addresses; and controlling the accessing of the configuration data by the processor core to read the configuration data from addresses of the configuration memory mapped to the virtual addresses.

A range of the virtual addresses may correspond to a range of addresses of the configuration data stored in the main memory.

The controlling of the accessing of the configuration data may include controlling the accessing of the configuration data, based on a configuration memory management table to manage a loading state of the configuration data in the configuration memory.

The configuration memory management table may include mapping information between addresses of the main memory and the addresses of the configuration memory, which is based on the virtual addresses.

The configuration memory management table may include information regarding the addresses of the configuration memory allocated to the configuration data so as to sequentially load the configuration data into the configuration memory when size of the configuration data stored in the main memory exceeds size of the configuration data.

The configuration memory management table may include at least one among a loop valid field, a line valid field, a completed field, a loop size field, and a configuration memory address field.

The loading state of the configuration data may be determined based on the schedule of the loop operations which is scheduled by a compiler.

The configuration data may include operation code of the function units and information regarding a connection between the function units to process the loop operations according to a coarse-grained architecture (CGA) mode.

According to a further embodiment of the present invention, an apparatus includes a main memory storing configuration data of a schedule of loop operations to be performed in parallel by function units, and a reconfigurable processor. The reconfigurable processor includes a processor core to request access to the configuration data by using virtual addresses, a configuration memory to store the configuration data loaded from the main memory, and a configuration memory management unit to control the access to the configuration data by the processor core to read the configuration data from addresses of the configuration memory mapped to the virtual addresses.

According to one or more embodiments of the present invention, a computer readable recording medium stores a program that causes a computer to perform the method of operating a reconfigurable processor.

BRIEF DESCRIPTION OF THE DRAWINGS

These and/or other aspects will become apparent and more readily appreciated from the following description of the embodiments, taken in conjunction with the accompanying drawings in which:

FIG. 4 is a configuration memory management table used for a configuration memory management unit to manage a loading state of a configuration memory according to an embodiment of the present invention;

FIG. 5 is a table showing a loading state of a configuration memory based on values of a 'loop valid' field, a 'line valid' field, and a 'completed' field according to an embodiment of the present invention;

DETAILED DESCRIPTION

Figure 1:
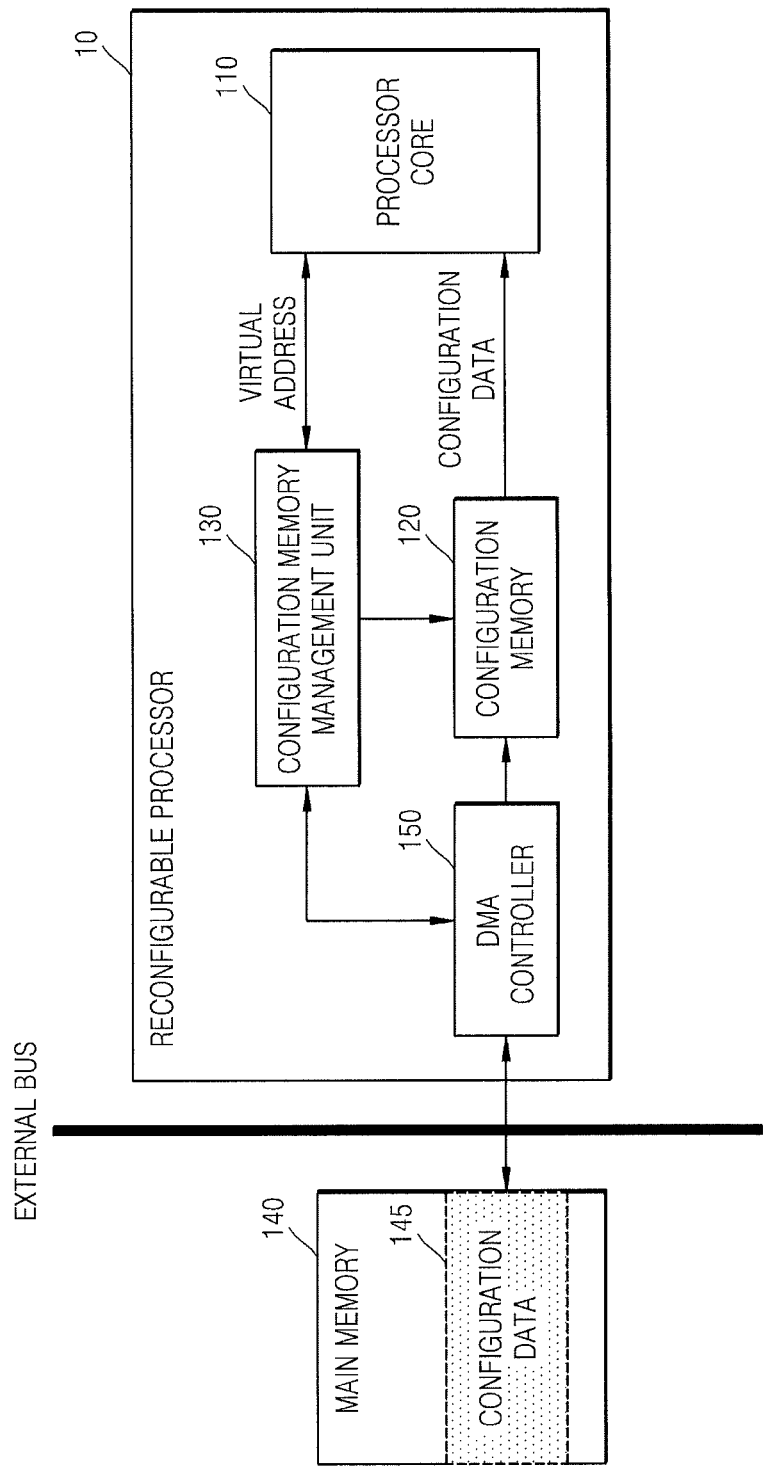
FIG. 1 is a block diagram of a reconfigurable processor according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, expressions such as "at least one of," when preceding a list of elements, modify the entire list of elements and do not modify the individual elements of the list.

FIG. 1 is a block diagram of a reconfigurable processor 10 according to an embodiment of the present invention.

Referring to FIG. 1, the reconfigurable processor 10 includes a processor core 110, a configuration memory 120, a configuration memory management unit 130, and direct memory access (DMA) controller 150. The reconfigurable processor 10 may access a main memory 140 via an external bus.

FIG. 1 illustrates some elements of the reconfigurable processor 10 that are related to the current embodiment to prevent the features of the current embodiment from being obscured. It would be apparent to general technicians in the technical field to which the current embodiment pertains that the reconfigurable processor 10 may further include other general elements.

The reconfigurable processor 10 includes hardware that is configurable such that an operation thereof is optimized to perform a specific task, instructions, operations, etc. In an embodiment, a configuration of the reconfigurable processor 10 may be determined through compiling performed using a compiler.

The processor core 110 includes an array of a plurality of function units (FUs). The FUs of the processor core 110 may be an arithmetic logic unit (ALU), a multiplier, a load/store unit, etc. A plurality of input/output (I/O) paths may be present among the FUs. The processor core 110 may further include a local register file.

The processor core 110 is operated according to two different modes: a very long instruction word (VLIW) mode and a coarse-grained array (CGA) mode.

In the CGA mode, the processor core 110 may perform loop operations in parallel with various FUs therein. That is, when the processor core 110 is operated according to the CGA mode, the processor core 110 may perform a loop-level parallelism (LLP).

In the VLIW mode, the processor core 110 may perform other general serial operations with some FUs therein. However, in the VLIW mode, the processor core 110 may further perform simple loop operations or loop operations that are repeatedly performed a small number of times. That is, when the processor core 110 is operated according to the VLIW mode, the processor core 110 may perform an instruction-level parallelism (ILP).

The main memory 140 includes hardware to store configuration data 145 and other data and may be embodied as a dynamic random access memory (DRAM), but embodiments of the present invention are not limited thereto.

The configuration data 145 includes data scheduled (complied) by a compiler and including operation codes of the FUs of the processor core 110 or information regarding a connection between the FUs, and represents a schedule of operations to be performed by the reconfigurable processor 10.

The processor core 110 and the main memory 140 may be connected via the external bus as described above.

The DMA controller 150 controls inputting of data to and outputting of data from the reconfigurable processor 10 and the main memory 140 when the reconfigurable processor 10 accesses the configuration data 145 stored in the main memory 140 or other data. The DMA controller 150 may control the configuration data 145 to be loaded into the configuration memory 120, under control of the configuration memory management unit 130 which will be describes below.

The configuration memory 120 includes hardware to load the configuration data 145 from the main memory 140 and storing the configuration data 145 and may be embodied as a static random access memory (SRAM) operating at higher speeds than a DRAM, but embodiments of the present invention are not limited thereto. The size of the configuration memory 120 according to the current embodiment may be smaller than that of the main memory 140 but embodiments of the present invention are not limited thereto.

In general, if the amounts of loop operations to be performed in parallel by the processor core 110 is very high or an iteration interval (II) of the loop operations is very large, the entire configuration data 145 is difficult to be loaded into the configuration memory 120 that is smaller than the main memory 140 in size.

However, according to the current embodiment, the loop operations may be performed at a high speed while reducing stalling of the processor core 110 by performing address translation using the configuration memory management unit 130 that manages a loading state of the configuration memory 120.

More specifically, the processor core 110 requests the configuration memory management unit 130 to access the configuration data 145 regarding a schedule of the loop operations to be performed in parallel with the FUs, based on virtual addresses. In an embodiment, a range of the virtual addresses may correspond to a range of addresses of the configuration data 145 stored in the main memory 140.

The configuration memory management unit 130 controls accessing of the configuration data 145 by the processor core 110 to read the configuration data 145 at addresses of the configuration memory 120 mapped to virtual addresses requested.

Here, the configuration memory management unit 130 manages addresses of the main memory 140 and the configuration memory 120 based on the virtual addresses such that the addresses of the main memory 140 and the addresses of the configuration memory 120 are mapped to each other. That is, the configuration memory management unit 130 may control accessing of the configuration data 145 by the processor core 110, based on the virtual addresses and mapping information between the addresses of the main memory 140 and the addresses of the configuration memory 120.

In particular, the configuration memory management unit 130 may control accessing of the configuration data 145 by the processor core 110, based on a configuration memory management table to manage a loading state of the configuration data 145 in the configuration memory 120.

As will be described in detail below, the configuration memory management table includes a 'loop valid' field, a 'line valid' field, a 'completed' field, a 'loop size' field, a 'configuration memory (CM) address' field, etc., and contains information to control accessing of the configuration data 145 by the processor core 110.

As described above, the processor core 110 uses the virtual addresses to access the configuration data 145 stored in the configuration memory 120 rather than actual or physical addresses of the configuration memory 120. Thus, the configuration data 145 that is not stored in the configuration memory 120 may also be requested to access.

Figure 2:
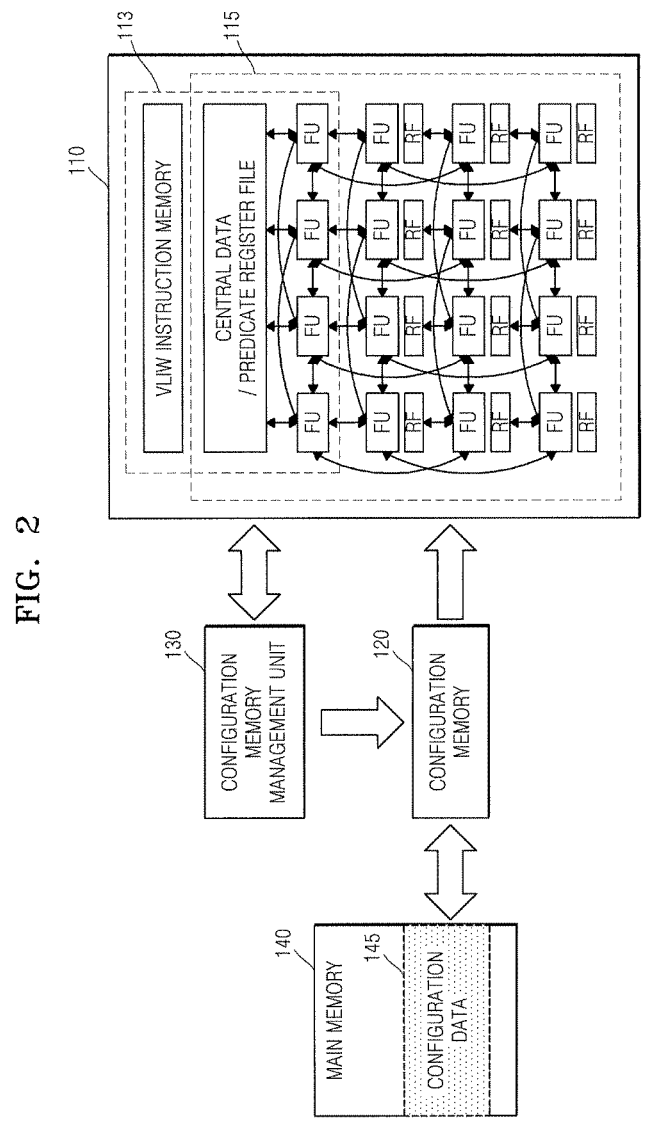
FIG. 2 is a detailed diagram illustrating an architecture of a processor core, and the relationship among the processor core, a configuration memory, and a main memory according to an embodiment of the present invention.

FIG. 2 is a diagram illustrating a detailed architecture of the processor core 110, and the relationship among the processor core 110, the configuration memory 120, and the main memory 140 according to an embodiment of the present invention.

Referring to FIG. 2, the processor core 110 may be embodied as an architecture including sixteen FUs, register files (RFs), etc. However, the number of the FUs and the number of the RFs are not limited and may be changed variously.

As described above, the 16 FUs of the processor core 110 are connected in various patterns to perform loop operations in parallel. In particular, when the processor core 110 is operated according to a CGA mode 115, the operation codes of the configuration data 145 may be distributed to the sixteen FUs in a disperse way to perform the loop operations in parallel. When the processor core 110 is operated according to a VLIW mode 113, only some of the FUs may be used to perform a VLIW instruction.

As described above, the configuration data 145 loaded from the main memory 140 to the configuration memory 120 includes data regarding a connection between the FUs to perform the loop operations in parallel, operation codes to be executed in parallel with the FUs, etc.

When a request to provide a virtual address is provided to the configuration memory management unit 130 from each of the sixteen FUs, the configuration memory management unit 130 controls the requested virtual addresses to be translated into actual addresses of the configuration memory 120 so that each of the sixteen FUs may access the configuration data 145 stored in the configuration memory 120.

Figure 3:
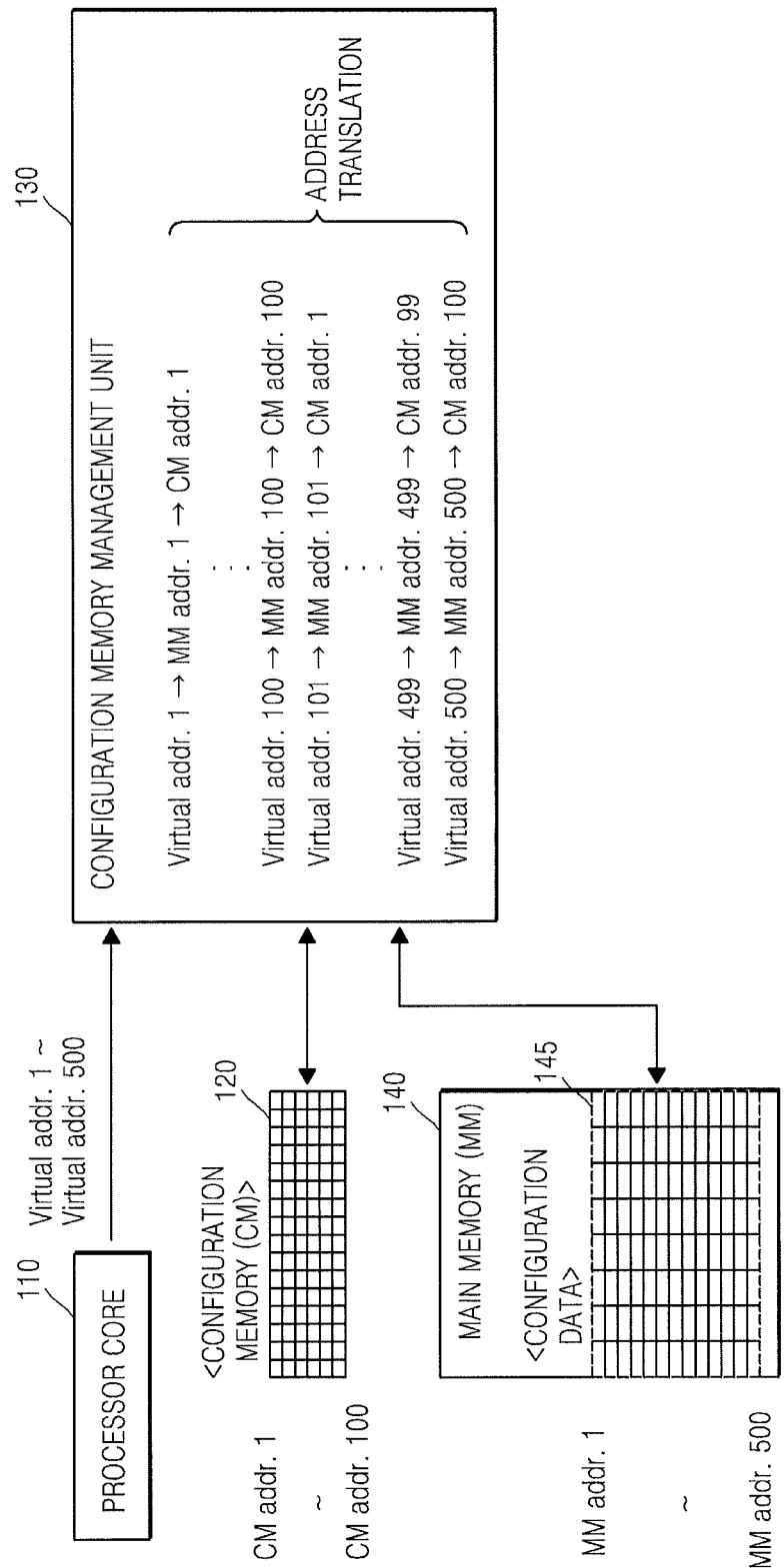
FIG. 3 is a diagram for explaining address translation performed by a configuration memory management unit according to an embodiment of the present invention.

FIG. 3 is a diagram for explaining address translation performed by the configuration memory management unit 130 according to an embodiment of the present invention.

The embodiment of FIG. 3 will now be described on an assumption that the size of the configuration memory 120 is smaller than that of the main memory 140. For convenience of explanation, it is hereinafter assumed that the configuration memory 120 stores, e.g., CM addresses '1' to '100' and the main memory 140 stores, e.g., MM addresses '1' to '500', and data is input or output in the order of the CM addresses '1' to '100' or the MM addresses '1' to '500'. However, the current embodiment is not limited thereto.

The processor core 110 requests the configuration memory management unit 130 to access the configuration data 145 in the order of the virtual addresses '1' to '500'. In an embodiment, the virtual addresses '1' to '500' may correspond to the MM addresses '1' to '500' of the main memory 140 at which the configuration data 145 is sequentially stored.

The configuration memory management unit 130 translates the virtual addresses requested by the processor core 110 into addresses of the configuration memory 120. The configuration memory management unit 130 translates the virtual addresses into corresponding addresses (MM addresses) of the main memory 140, and then translates the translated addresses into addresses (CM addresses) of the configuration memory 120 mapped to the addresses (MM addresses) of the main memory 140.

In particular, when the size of the configuration data 145 stored in the main memory 140 exceeds the size of the configuration memory 120, the configuration memory management unit 130 allocates the addresses of the configuration memory 120 to the configuration data 145 such that the configuration data 145 is sequentially loaded into the configuration memory 120.

More specifically, the configuration data 145 is loaded into the configuration memory 120 in the order of the MM addresses '1' to '500'. However, ad described above, the entire configuration data 145 cannot be loaded at once in the order of the MM addresses '1' to '500' due to the small size of the configuration memory 120. Accordingly, the configuration data 145 is divided and loaded into the configuration memory 120 in the order of pieces of the configuration data 145.

The configuration memory management unit 130 performs address translation based on address mapping information (or allocation information) stored in the configuration memory management table.

The configuration data 145 stored at the MM addresses '1' to '100' corresponding to the virtual addresses '1' to '100' may be loaded at the CM addresses '1' to '100' of the configuration memory 120 at once. Thus, the configuration memory management unit 130 may map the virtual addresses '1' to '100' to the CM addresses '1' to '100', respectively.

However, additional configuration data 145 cannot be loaded into the configuration memory 120 in a state in which the configuration data 145 has been loaded at the CM addresses '1' to '100' of the configuration memory 120. Thus, when the configuration data 145 stored in the configuration memory 120 is deleted, the additional configuration data 145 corresponding to subsequent addresses of the configuration memory 120 is capable of being loaded into the configuration memory 120. Thus, the configuration memory management unit 130 may map the virtual addresses '101' to '200' to the CM addresses '1' to '100' in an overlapping manner such that the virtual addresses '101' to '200' overlap with the virtual addresses '1' to '100' mapped to the CM addresses '1' to '100'.

Similarly, the configuration memory management unit 130 may map the virtual addresses '201' to '300' to the CM addresses '1' to '100', the virtual addresses 301 to 400 to the CM addresses 1 to 100, and the virtual addresses 401 to 500 to the CM addresses 1 to 100 in the overlapping manner.

As described above, the processor core 110 requests the configuration memory management unit 130 to access the configuration data 145 based on the virtual addresses, and the configuration memory management unit 130 translates the virtual addresses into the actual addresses (CM addresses) of the configuration memory 120. Thus, even if the whole size of the configuration data 145 exceeds the size of the configuration memory 120, the processor core 110 is capable of accessing the configuration data 145 at a high speed.

When the whole size of the configuration data 145 stored in the main memory 140 does not exceed the size of the configuration memory 120, the configuration memory management unit 130 may not map the virtual address to the addresses (CM addresses) of the configuration memory 120 in the overlapping manner.

FIG. 4 is a configuration memory management table 400 used for the configuration memory management unit 130 to manage a loading state of the configuration memory 120 according to an embodiment of the present invention.

Referring to FIG. 4, the configuration memory management table 400 includes a 'loop valid' field, a 'line valid' field, a 'completed' field, a 'loop size' field, a 'configuration memory address (CM ADDR)' field, a 'main memory address (MM ADDR)' field, etc. The configuration memory management table 400 may further include fields related to other general information.

The 'loop valid' field represents whether configuration data 145 regarding a current loop operation to be performed is stored in the configuration memory 120. When the 'loop valid' field represents 'invalid', the configuration memory management unit 130 loads the configuration data 145 regarding the current loop operation from the main memory 140. In an embodiment, the 'loop valid' field may represent 'valid' when the 'loop valid' field has a value of 1 and represent 'invalid' when the 'loop valid' field has a value of 0, but embodiments of the present invention are not limited thereto.

The 'line valid' field represents whether the configuration data 145 regarding the current loop operation is stored at all addresses of at least one line of the configuration memory 120. When the 'line valid' field represents 'invalid', the configuration memory management unit 130 loads the configuration data 145 regarding the current loop operation from the main memory 140 until the configuration data 145 is stored at all the addresses of the at least one line. In an embodiment, the 'line valid' field may represent 'valid' when the 'line valid' field has a value of 1 and represent 'invalid' when the 'line valid' field has a value of 0, but embodiments of the present invention are not limited thereto.

The processor core 110 may wait to read the configuration data 145 until the configuration data 145 is completely loaded at all the addresses of the at least one line, and read the configuration data 145 at once in a unit of one line, e.g., 1000 bytes, when the loading of the configuration data 145 is completed.

The 'completed' field may represent whether all or some of the configuration data 145 regarding the current loop operation is stored in the configuration memory 120. When the 'completed' field represents that only some of the configuration data 145 regarding the current loop operation is stored in the configuration memory 120, the configuration memory management unit 130 allows the processor core 110 to access the some of the configuration data 145 stored in the configuration memory 120. Then the configuration memory management unit 130 loads the remaining configuration data 145 to the configuration memory 120 from the main memory 140. In an embodiment, it may be understood that all the configuration data 145 is loaded into the main memory 140 when the 'completed' field has a value of 1 and only some of the configuration data 145 is loaded into the main memory 140 when the 'completed' field has a value of 0, but embodiments of the present invention are not limited.

The 'loop size' field represents a loop size of the current loop operation.

The 'CM ADDR' field and the 'MM ADDR' field represent mapping information among virtual addresses, addresses of the configuration memory 120, and addresses of the main memory 140. That is the configuration memory management unit 130 may translate virtual addresses requested by the processor core 110, based on the 'CM ADDR' field and the 'MM ADDR' field.

Referring to FIG. 4, in the configuration memory management table 400, values of these fields are set for first to third loops 410, 420, and 430. The values set in the configuration memory management table 400 of FIG. 4 will be described in association with the diagram of FIG. 3 below.

All configuration data 145 that is related to the first loop 410 and stored at the MM addresses '1' to '30' of the main memory 140 is loaded into the configuration memory 120. However, only some of the configuration data 145 that is related to the first loop 410 and stored at the MM addresses '31' to '150' of the main memory 140, e.g., only the configuration data 145 stored at the MM addresses '31' to '100', is loaded into the configuration memory 120. This is because that the size of the configuration memory 120 is smaller than that of the main memory 140.

Thus, the configuration data 145 that is related to the first loop 410 and stored at the MM addresses '101' to '150' of the main memory 140 is redundantly allocated to the CM addresses '1' to '50' of the configuration memory 120, so that this configuration data 145 may be newly loaded into the configuration memory 120 after the configuration data 145 related to the first loop 410 loaded at the CM addresses 1 to 100 of the configuration memory 120 is completely processed in parallel.

Consequently, all the configuration data 145 is not loaded at the MM addresses '31' to '150' of the configuration memory 120 and thus the 'completed' field of the configuration memory management table 400 has a value of 0.

Configuration data 145 related to the second and third loops 420 and 430 has yet to be loaded into the configuration memory 120 and thus the values of the 'loop valid' fields related to the second and third loops 420 and 430 are 0. The configuration data 145 related to the second loop 420 cannot be loaded into the configuration memory 120 at once, similar to the configuration data 145 related to the first loop 410, and thus addresses of the configuration memory 120 are allocated to the configuration data 145 related to the second loop 420 such that this configuration data 145 may be sequentially loaded into the configuration memory 120.

FIG. 5 is a table showing a loading state of a configuration memory based on values of a 'loop valid' field, a 'line valid' field, and a 'completed' field according to an embodiment of the present invention.

Referring to FIG. 5, the 'loop valid' field may represent 'valid' when the 'loop valid' field has a value of 1 and represent 'invalid' when the 'loop valid' field has a value of 0. The 'line valid' field may represent 'valid' when the 'line valid' field has a value of 1 and represent 'invalid' when the 'line valid' field has a value of 0. Furthermore, it means that all configuration data 145 regarding a current loop operation to be processed is loaded when the 'completed' field has a value of 1 and only some of the configuration data 145 is loaded when the 'completed' field has a value of 0. However, embodiments of the present invention are not limited thereto and these values may be changed.

When all the 'loop valid' field, the 'line valid' field, and the 'completed' field have a value of 1, it means that all the configuration data 145 related to the current loop operation is loaded into the configuration memory 120.

When the 'loop valid' field and the 'line valid' field have a value of 1 and the 'completed' field has a value of 0, it means that only some of the configuration data 145 is loaded into the configuration memory 120. In this case, the configuration memory management unit 130 allows the processor core 110 to access the some of the configuration data 140 loaded into the configuration memory 120. Then, the configuration memory management unit 130 loads the remaining configuration data 145 into the configuration memory 120 from the main memory 140.

When the 'loop valid' field has a value of 1 and the 'line valid' field has a value of 0, the configuration data 140 regarding the current loop operation is loaded into the configuration memory 120 but is not loaded at all addresses of at least one line of the configuration memory 120. In this case, the configuration memory management unit 130 loads the configuration data 140 regarding the current loop operation from the main memory 140 until this configuration data 140 is stored at all the addresses of the at least one line of the configuration memory 120.

When the 'loop valid' field has a value of 0, it means that the configuration data 140 regarding the current loop operation is not loaded into the configuration memory 120. In this case, the configuration memory management unit 130 loads the configuration data 140 regarding the current loop operation from the main memory 140 into the configuration memory 120.

Referring back to FIG. 1, according to the current embodiment, the processor core 110 requests the configuration memory management unit 130 to access the configuration data 145 based on the virtual addresses and the configuration memory management unit 130 dynamically updates the configuration data 145 to be loaded at addresses configuration memory 120, based on the configuration memory management table. Accordingly, loop operations related to a plurality of loops may be performed at a high speed while decreasing a processor stall. Also, even if loop size or the size of the configuration data 145 exceeds the size of the configuration memory 120, configuration data 145 regarding a loop operation to be performed may be dynamically loaded into the configuration memory 120 beforehand. Thus, even if the size of the configuration memory 120 included in the reconfigurable processor 10 is small, the processor core 110 is capable of performing the loop operation at a high speed.

Figure 6:
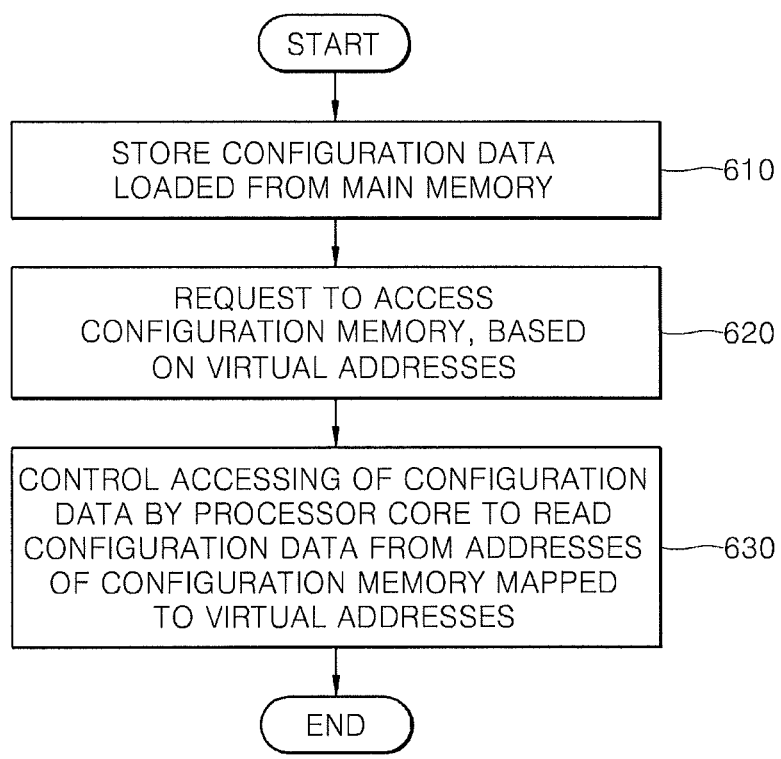
FIG. 6 is a flowchart of a method of operating a reconfigurable processor according to an embodiment of the present invention.

FIG. 6 is a flowchart of a method of operating a reconfigurable processor according to an embodiment of the present invention. Referring to FIG. 6, the method of operating the reconfigurable processor according to the current embodiment includes operations to be sequentially performed using the reconfigurable processor 10 of FIG. 1. Thus, although not described below, the above description related to the reconfigurable processor 10 may also apply to the method of FIG. 6.

Referring to FIGS. 1 and 6, in operation 610, the configuration memory 120 stores configuration data 145 loaded from the main memory 140 and specifying a schedule of loop operations to be currently performed in parallel with the FUs of the processor core 110.

In operation 620, the processor core 110 requests the configuration memory management unit 130 to access the configuration data 145, based on virtual addresses.

In operation 630, the configuration memory management unit 130 controls the accessing of the configuration data 145 by the processor core 10 to read the configuration data 145 from addresses of the configuration memory 120 mapped to the virtual addresses.

Figure 7:
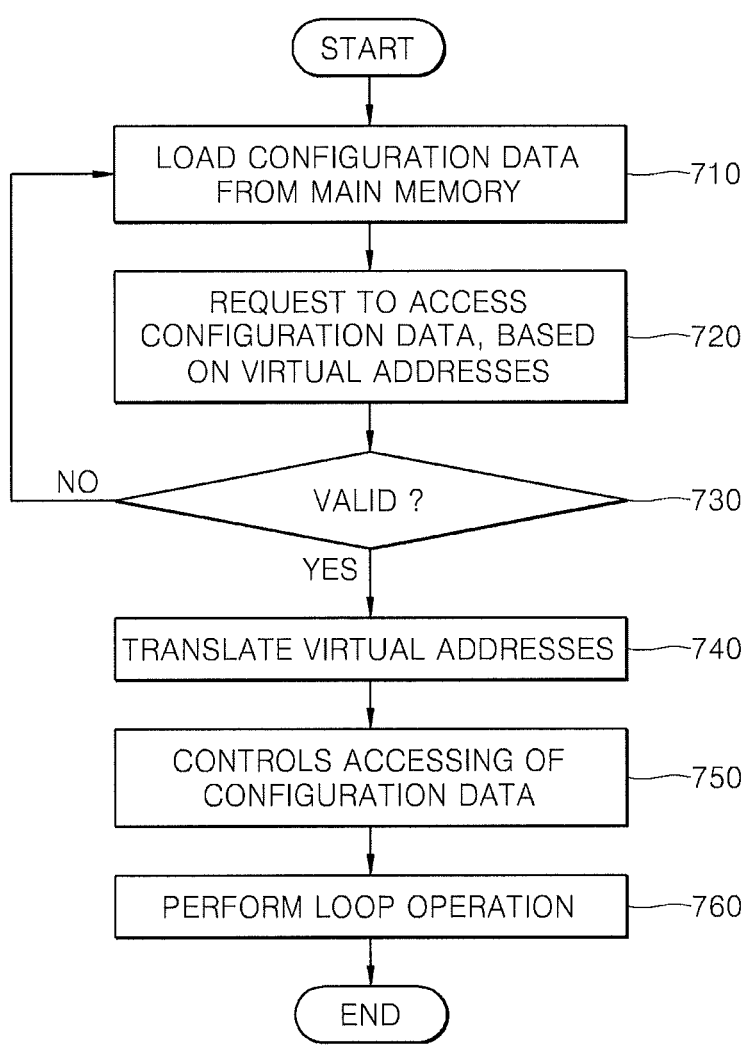
FIG. 7 is a detailed flowchart of a method of operating a reconfigurable processor according to another embodiment of the present invention.

FIG. 7 is a detailed flowchart of a method of operating a reconfigurable processor according to another embodiment of the present invention. FIG. 7 is a detailed flow chart of the method of operating the reconfigurable processor 10 illustrated in FIG. 6.

In operation 710, the configuration memory 120 loads the configuration data 145 regarding the current loop operation from the main memory 140, and stores the configuration data 145.

In operation 720, the processor core 110 requests the configuration memory management unit 130 to access the configuration data 145, based on the virtual addresses.

In operation 730, the configuration memory management unit 130 determines whether the configuration data 145 requested by the processor core 110 and corresponding to the virtual addresses is valid. That is, the configuration memory management unit 130 checks values a 'loop valid' field, a 'line valid' field, and a 'completed' field corresponding to each of the virtual addresses, which are included in a configuration memory management table.

If the configuration memory management unit 130 determines that the configuration data 145 is valid, the method proceeds to operation 740. However, if the configuration memory management unit 130 determines that the configuration data 145 is invalid, the method returns to operation 710 and the configuration memory 120 additionally loads the configuration data 145 regarding the current loop operation from the main memory 140 and stores the additionally loaded configuration data 145.

In operation 740, the configuration memory management unit 130 translates the virtual addresses into actual addresses of the configuration memory 120.

In operation 750, the configuration memory management unit 130 controls the processor core 110 to access the configuration data 145 stored in the actual addresses of the configuration memory 120.

In operation 760, the processor core 110 performs the loop operations based on the configuration data 145.

As described above, according to the one or more of the above embodiments of the present invention, a processor core requests a configuration memory to access configuration data, based on virtual addresses, thereby decreasing a processor stall and performing loop operations related to a plurality of loops at a high speed. Also, even if loop size or the size of the configuration data exceeds the size of the configuration memory, configuration data regarding a loop operation to be performed may be dynamically loaded into the configuration memory beforehand. Thus, even if the configuration memory included in the reconfigurable processor is small in size, the processor core is capable of performing the loop operations at a high speed.

The embodiments of the present invention set forth herein may be embodied as a computer program, stored in a computer readable recording medium, and executed using a general digital computer. Data structures employed in the above embodiments may be recorded on a computer readable recording medium via various means. Examples of the computer readable recording medium include magnetic media (e.g., hard disks, floppy disks, and magnetic tapes), optical media (e.g., CD-ROMs and DVDs), etc.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A reconfigurable processor comprising:
   a processor core to request access to configuration data regarding a schedule of loop operations to be performed in parallel by function units by using virtual addresses;
   a configuration memory to store the configuration data loaded from a main memory; and
   a configuration memory management unit to control the access of the processor core to the configuration data and read the configuration data from addresses of the configuration memory mapped to the virtual addresses,
   wherein the configuration memory management unit manages addresses of the main memory and the addresses of the configuration memory by mapping the addresses of the main memory and the addresses of the configuration memory to each other, based on the virtual addresses,
   wherein:
      the configuration memory management unit allocates the addresses of the configuration memory to the configuration data so as to sequentially load the configuration data into the configuration memory if a size of the configuration data stored in the main memory exceeds a size of the configuration memory, and
      the configuration memory management unit maps the virtual addresses to the addresses of the configuration memory in a non-overlapping manner if the size of the configuration data stored in the main memory does not exceed the size of the configuration memory.

2. The reconfigurable processor of claim 1, wherein a range of the virtual addresses corresponds to a range of addresses of the configuration data stored in the main memory.

3. The reconfigurable processor of claim 1, wherein the configuration memory management unit controls the accessing of the configuration data, based on a configuration memory management table to manage a loading state of the configuration data in the configuration memory.

4. The reconfigurable processor of claim 3, wherein the loading state of the configuration data is determined based on the schedule of the loop operations that is scheduled by a compiler.

5. The reconfigurable processor of claim 3, wherein the configuration memory management table comprises a loop valid field which represents whether the configuration data to be processed is stored in the configuration memory,
   wherein, when the loop valid field represents invalid, the configuration memory management unit loads the configuration data from the main memory.

6. The reconfigurable processor of claim 3, wherein the configuration memory management table comprises a line valid field which represents whether the configuration data to be processed is stored at all addresses of at least one line of the configuration memory,
   wherein, when the line valid field represents invalid, the configuration memory management unit loads the configuration data from the main memory until the configuration data is stored at all the addresses of the at least one line.

7. The reconfigurable processor of claim 3, wherein the configuration memory management table comprises a completed field which represents whether all or some of the configuration data to be processed is stored in the configuration memory,
wherein, when the completed field represents that some of the configuration data is stored, the configuration memory management unit allows the processor core to access the some of the configuration data stored, and loads the remaining configuration data from the main memory.

8. The reconfigurable processor of claim 3, wherein the configuration memory management table comprises at least one of:
a loop size field which represents loop size of the loop operation to be processed; and
a configuration memory address field which represents information regarding the addresses of the configuration memory mapped to the virtual addresses.

9. The reconfigurable processor of claim 1, wherein the configuration data comprises operation code of the function units and information regarding a connection between the function units to process the loop operation according to a coarse-grained architecture (CGA) mode.

10. A method of operating a reconfigurable processor, the method comprising:
storing configuration data in a configuration memory, the configuration data loaded from a main memory and specifying a schedule of loop operations to be processed in parallel with function units of a processor core;
requesting, by the processor core, to access the configuration data by using virtual addresses; and
controlling the processor core to access the configuration data and read the configuration data from addresses of the configuration memory mapped to the virtual addresses,
wherein addresses of the main memory and the addresses of the configuration memory are mapped to each other based on the virtual addresses,
wherein the addresses of the configuration memory are allocated to the configuration data so as to sequentially load the configuration data into the configuration memory if a size of the configuration data stored in the main memory exceeds a size of the configuration memory, and
wherein the virtual addresses are mapped to the addresses of the configuration memory in a non-overlapping manner if the size of the configuration data stored in the main memory does not exceed the size of the configuration memory.

11. The method of claim 10, wherein a range of the virtual addresses corresponds to a range of addresses of the configuration data stored in the main memory.

12. The method of claim 10, wherein the controlling of the accessing of the configuration data comprises controlling the accessing of the configuration data, based on a configuration memory management table to manage a loading state of the configuration data in the configuration memory.

13. The method of claim 12, wherein the configuration memory management table comprises mapping information between the addresses of the main memory and the addresses of the configuration memory, which is based on the virtual addresses.

14. The method of claim 12, wherein the configuration memory management table comprises information regarding the addresses of the configuration memory allocated to the configuration data so as to sequentially load the configuration data into the configuration memory when the size of the configuration data stored in the main memory exceeds the size of the configuration data.

15. The method of claim 12, wherein the configuration memory management table comprises at least one among a loop valid field, a line valid field, a completed field, a loop size field, and a configuration memory address field.

16. The method of claim 12, wherein the loading state of the configuration data is determined based on the schedule of the loop operations which is scheduled by a compiler.

17. The method of claim 10, wherein the configuration data comprises operation code of the function units and information regarding a connection between the function units to process the loop operations according to a coarse-grained architecture (CGA) mode.

18. A non-transitory computer readable recording medium having recorded thereon a computer program for executing the method of claim 10.

19. An apparatus comprising:
a main memory storing configuration data of a schedule of loop operations to be performed in parallel by function units; and
a reconfigurable processor, including:
a processor core to request access to the configuration data by using virtual addresses;
a configuration memory to store the configuration data loaded from the main memory; and
a configuration memory management unit to control the access of the processor core to the configuration data and read the configuration data from addresses of the configuration memory mapped to the virtual addresses,
wherein the configuration memory management unit manages addresses of the main memory and the addresses of the configuration memory by mapping the addresses of the main memory and the addresses of the configuration memory to each other, based on the virtual addresses,
wherein:
the configuration memory management unit allocates the addresses of the configuration memory to the configuration data so as to sequentially load the configuration data into the configuration memory if a size of the configuration data stored in the main memory exceeds a size of the configuration memory, and
the configuration memory management unit maps the virtual addresses to the addresses of the configuration memory in a non-overlapping manner if the size of the configuration data stored in the main memory does not exceed the size of the configuration memory.

* * * * *